United States Patent [19]

Berry et al.

[11] Patent Number: 4,788,659
[45] Date of Patent: Nov. 29, 1988

[54] SCREEN BUILDING TO FACILITATE LATER SELECTION OF PORTIONS THEREOF

[75] Inventors: Richard E. Berry, Georgetown; Thomas M. Ruiz, Austin, both of Tex.

[73] Assignee: International Business Machines Corporation, Armonk, N.Y.

[21] Appl. No.: 666,846

[22] Filed: Oct. 31, 1984

[51] Int. Cl.⁴ .................... G06F 15/62; G06F 15/60; G06F 3/037
[52] U.S. Cl. .................................................. 364/900
[58] Field of Search ........ 364/200, 300, 900 MS File, 364/518

[56] References Cited

U.S. PATENT DOCUMENTS

| Re. 32,130 | 4/1986 | Frederickson et al. | 364/900 |
|---|---|---|---|
| 4,454,592 | 6/1984 | Cason et al. | 364/900 |
| 4,456,972 | 6/1984 | Lee et al. | 364/900 |
| 4,475,239 | 10/1984 | von Raamsdonk | 364/900 |
| 4,566,065 | 1/1986 | Toth | 364/300 |
| 4,586,158 | 4/1986 | Brandle | 364/900 |
| 4,587,633 | 5/1986 | Nong et al. | 364/900 |
| 4,611,306 | 9/1986 | Crehan et al. | 364/900 |

FOREIGN PATENT DOCUMENTS 0103317 3/1984 United Kingdom .

Primary Examiner—Emanuel S. H. Kemen
Assistant Examiner—Christopher Lynt
Attorney, Agent, or Firm—J. H. Barksdale, Jr.; H. St. Julian

[57] ABSTRACT

A method of, and system for, building a screen and retrieving related portions of the screen through single button depression. The order with which various portions are built in building a screen is used upon recall of the screen and selection of one portion for controlling selection of related portions. Consider a wheel which is built by building a hub, spokes, rim, and tire in order. Later recall of the wheel and selection of the spokes will permit selection of either the hub or rim upon single button depression.

8 Claims, 4 Drawing Sheets

SCREEN BUILDING TO FACILITATE LATER SELECTION OF PORTIONS THEREOF

DESCRIPTION

1. Technical Field

This invention relates generally to object selection, and more specifically to selection based on relationships of objects.

2. Background Art

Durinq a screen building operation, there is to some degree a logically ordered relationship between the various portions of the screen. For example, in the building of a cross section of a motor, the shaft is normally drawn or created first, then a rotor is connected to the shaft, next a stator is drawn, and then a shell or housing is drawn. Upon completion, there is a composite which can be stored for recall, modification, etc. However, with the use of some prior art application programs, recall is only of the composite. As such, a change in the rotor alone is not easily accomplished. With the use of other prior art application programs, each portion is a separate object and there is in effect an overlaying of screens to obtain an apparent composite. Here though, selection of an actual composite is time consuming and tedious in that the objects must first be tied together. Once the objects have been tied together to obtain an actual composite, separation for individual recall is again time consuming.

In view of the above, there has been no efficient manner of (1) building and tying together each of the portions on the same screen while maintaining each portion's individual status, and (2) permitting each portion and a composite of the portions to be recalled separately in the order built.

Viewing the prior art in greater detail, current state-of-the-art computer workstations allow the use of locator driven pointers which operators or users use to "point at" and "select" displayed objects. Often times the object is a complex structure consisting of multiple sub-objects or sub-parts and it is not clear whether the user is trying to select the whole object or one of the sub-objects. For example, an automobile wheel may be composed of a hub-cap, wheel rim, and tire. In order to select the entire wheel, the user must position the pointer somewhere on the wheel, but then there is ambiguity as whether the user wants the entire wheel or just the wheel component or sub-part on which the pointer is positioned.

Current solutions to the ambiguity problem typically require that the user explicitly "group" and "ungroup" the objects/sub-objects as appropriate for the desired selection. For example, if the wheel were originally created as three separate objects and the user desired to select the entire wheel, the user would have to request a group action, and identify each of the sub-parts. Selection on any part would then result in selection of the whole. If the user then wanted to select an individual part, ungrouping of the wheel would be required to break the wheel back down into its constituent parts. Based on the above, the problems with the prior art are:

(1) Tedious "grouping" and "ungrouping" may be required during a single editing session.
(2) When a user is dealing with previously defined and cataloged objects, the user may have no idea as to what the constituent parts are. For example, users normally create commonly used subassemblies, such as automobile wheels, and store these subassemblies away for later recall. Such a wheel subassembly can later be recalled four times in order to construct an automobile. However, if the user decides to change some aspect of the wheel assembly, such as the shape of the hub-cap, selection of that particular sub-part and the tedium associated therewith are required.

With the invention of this application:

(1) Sub-objects which make up an object and the object itself are sequentially selected and highlighted or separately displayed in the order built upon single button depression following selection of one of the sub-objects or the object. As such, grouping and ungrouping are not required, and sub-objects can be readily edited.

(2) A new user can readily ascertain the make-up of an object. This is accomplished in the following manner:

When the user positions the pointer on and selects an object, the entire object is highlighted (through video reversing, etc.) or displayed separately. If the user selects again through select button depression, the first built sub-object is selected and video reversed or displayed separately. For each subsequent select action, the next built sub-object is emphasized or highlighted, or displayed separately, until the last one in the order has been emphasized. Continued single button selection will cause a repeat of the selection cycle. With this invention, the user can then step through the object a sub-part at a time. When the desired sub-part has been selected the user performs an Enter action and selects it in order to close the selection process and cause any pending action to be taken on the selected sub-object.

Also in the prior art are function hierarchies such as the hierarchial cancel function on the IBM Displaywriter System. Here though, this linked menu driven system does not permit unrestricted calling of an individual menu, and restoring and cancelling functions at will.

From the above, the prior art is pertinent primarily in a background sense, and as such, falls short of either anticipating the instant invention, or rendering the instant invention obvious. The advances presented by the instant invention are that 1) during a screen building operation, each portion of the screen can be treated both as an individual portion and as a part of the entire screen, and 2) each portion can be called individually through depression of a single button. The advantages of those advances are improved ease of use, user friendliness, and flexibility.

DISCLOSURE OF THE INVENTION

A unique method of, and system for, building a screen are provided in order to facilitate selecting related portions of a screen for editing, review, etc. During a screen building operation, each portion which is to be unique is identified. A later recall of the screen and selection thereof or a portion thereof will result in a display of the selected portion or screen. For selecting portions related to the screen or a selected portion, only a single button depression is required.

BEST MODE FOR CARRYING OUT THE INVENTION GENERAL DESCRIPTION AND DEFINITIONS

Figure 7:
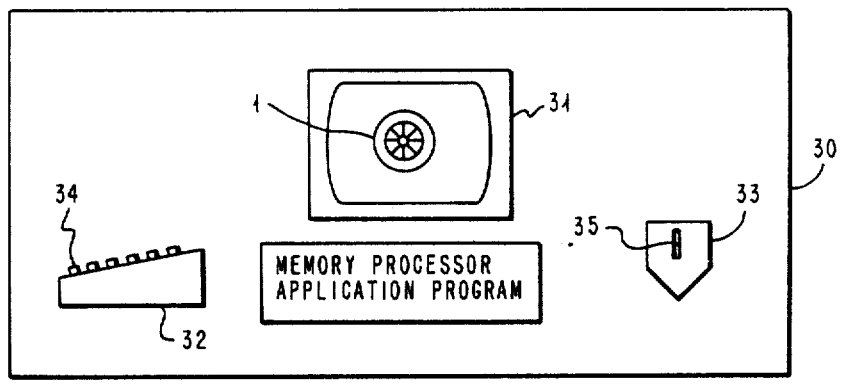
FIG. 7 illustrates a device controlled display computer system utilized with this invention.

To begin with, a screen is to be taken as information displayed at any particular time. This information can be stored in a bulk store or main memory and recalled. A screen will be displayed on the face of a cathode ray tube (CRT) included in a device controlled display standalone or host connected computer system 30 shown in FIG. 7. Included in the system will be a main memory. The information displayed on the face of the CRT 31 can be text, tables, graphics, etc. or any combination thereof. Device control of the system can be by keyboard 32, mouse 33, joy stick, light pen, etc., or any combination of these devices.

For purposes of clarity of explanation, it will be assumed that operation is in a draw graphics mode and that being built is a wheel screen which includes a wheel made up of hub, spoke, rim and tire portions. Throughout, reference will be made to sub-objects, parts and portions. These terms are to be taken as equivalent. Also, in the following the wheel as a whole will be an object. Further, the screen, wheel and object are to be taken as synonymous. Yet further, for purposes of this application, a user and an operator are to be taken as one and the same.

The devices used to draw, and later select portions of, the wheel are mouse 33 and keyboard 32.

With the instant invention, the initial chore is to build the wheel screen in such a manner that each portion of the screen can be retrieved for review and editing. The ability to retrieve each individual portion is extremely useful from manufacturing assembly and design standpoints. For example, the spokes alone can be selected and changed. Then the connecting related or adjacent portions can be selected and changed if need be. This is far more efficient and manageable than attempting to work on the spokes with the entire wheel displayed.

Two presentation embodiments are presented below. One is separate screen for a selected portion and the other is highlighting of a selected portion on the same screen. Highlighting can be by video reversing, color changing, etc. It should be appreciated that display of a selected portion as a separate screen is a form of highlighting.

DETAILED DESCRIPTION

Figure 1:
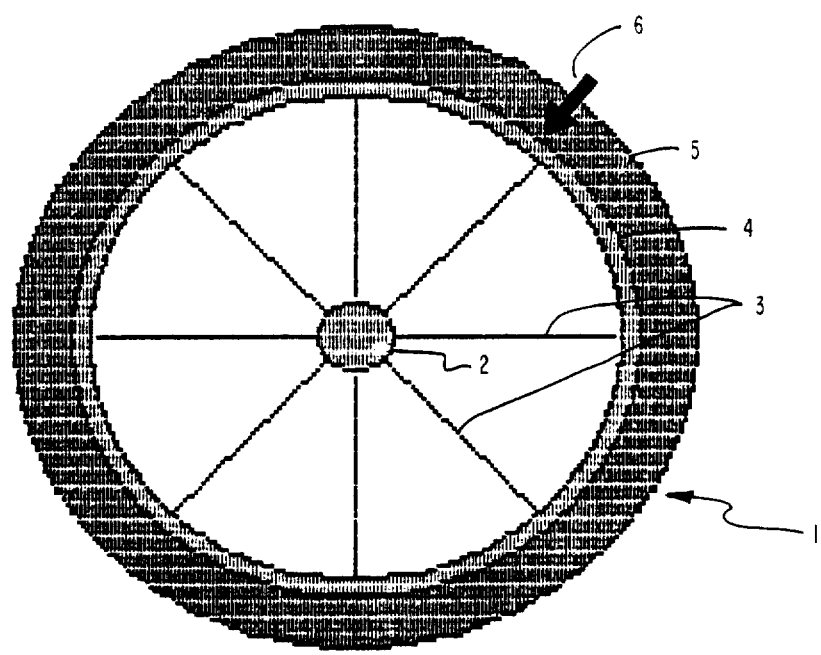
FIG. 1 represents a completed wheel screen made up of a plurality of portions.

For a more detailed understanding of the invention, reference is first made to FIG. 1. In this figure is depicted a wheel generally denoted by reference numeral 1. It is to be assumed that wheel 1 is being displayed on the face of CRT 31. As such, a wheel screen is depicted. Wheel 1 is up of hub 2, spokes 3, rim 4, and tire 5. Also shown in FIG. 1 is a pointing cursor 6 which is controlled by a mouse included in the system.

During the building of wheel 1, generally hub 2 will be drawn or built first, followed by spokes 3, rim 4 and tire 5. The building of hub 2 can be by calling a circle from a symbol table, sizing the circle, and then calling for a center fill. Of course, the circle could have been free handed. Upon completion of building hub 2, it is to be defined as a separate object, sub-object, entity or portion. This can be by depressing a function key 34 in FIG. 7 on keyboard 32 included in the system. The system has been structured to accept the function key as a defining key. For purposes of this invention, the system includes application programs for performing the system operations described. With hub 2 built, the next operation is to build spokes 3. As with hub 2, this can be by calling a spoke pattern from a symbol table, creating each individual spoke as a line, etc. With spokes 3 built, a function key is depressed for defining the spokes as a separate portion of wheel 1. Next, rim 4 is to be built. Rim 4 can be built by calling circles from a symbol table, sizing the circles, and calling for a center fill. Once built, rim 4 can be defined as a separate portion of wheel 1. Tire 5 can be built by calling a circle, sizing the circle, and then calling for a center fill. Thereafter, a function key is depressed for defining tire 5 as a separate portion of wheel 1. With wheel 1 built, it can be stored for later recall.

Figure 4:
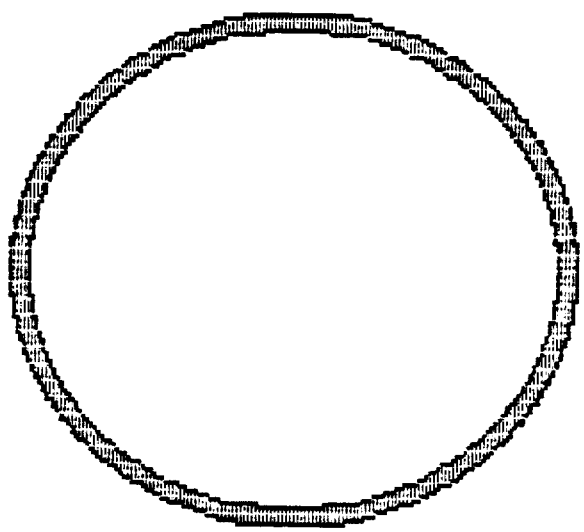
FIG. 4 represents a rim portion of the screen of FIG. 1.
Figure 5:
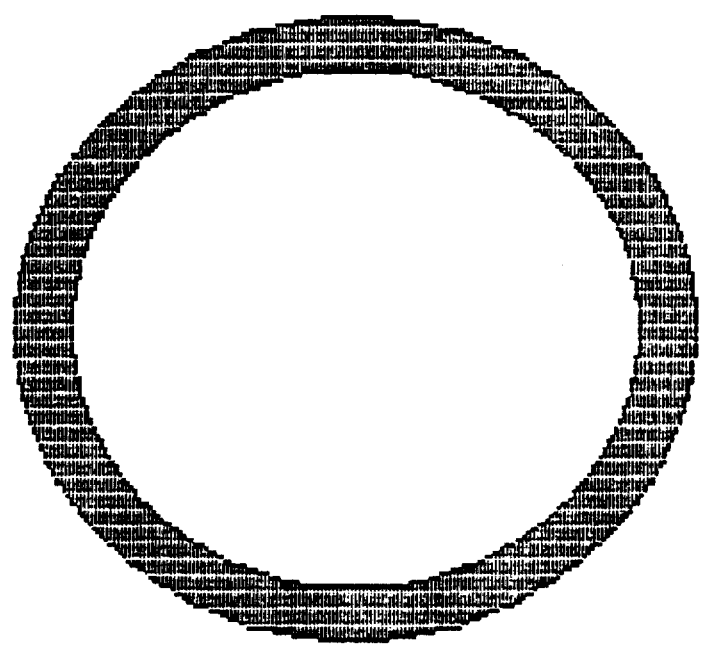
FIG. 5 represents a tire portion of the screen of FIG. 1.

If the configuration of rim 4 is to be changed, whether following building or upon recall of wheel 1, a pointing cursor 6 is fetched and positioned, through mouse positioning, coincident with rim 4. Thereafter, a select button 35 in FIG. 7 on the mouse 33 is depressed. This will result in rim 4 being displayed as a separate screen as depicted in FIG. 4. When displayed as shown in FIG. 4, its configuration can be changed or left in tact. Of course, rather than displaying rim 4 or any other portion of wheel 1 on a separate screen, rim 4 could be highlighted in terms of video reversing and displayed with the remainder of wheel 1. If tire 5 is then to be viewed, the only operator action necessary is depression of the select button on the mouse. Depression of the select button will result in selection and separate display of tire 5 as shown in FIG. 5. There is no need to fetch a pointing cursor and then position the cursor. This is because of the hierarchy or order established in building the wheel. That is, the order in which the various portions of wheel 1 were built and defined were stored during building. This order is then used to control subsequent selection. The extent of selection is based on the definition of the portion at the time the portion was built. For example, the portion made up of the spokes 3 includes all of spokes 3.

After tire 5 has been selected and displayed as the separate screen of FIG. 5, depression of the select button will result in selection and separate display of the entire wheel shown in FIG. 1. This is because the order of building the wheel was defined upon completion. The order is stored in a ring which is cycled through upon depression of the select button.

Figure 2:
FIG. 2 represents a hub portion of the screen of FIG. 1.
Figure 3:
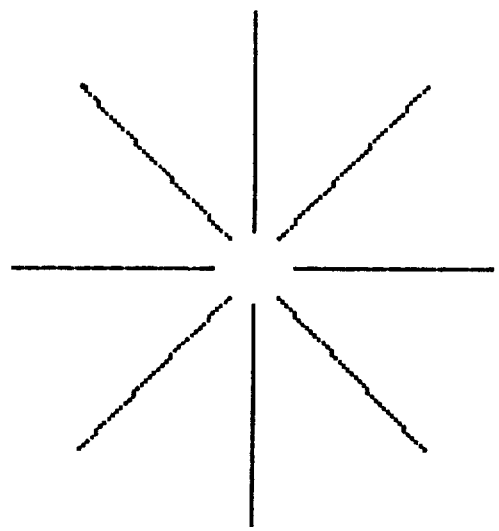
FIG. 3 represents a spoke portion of the screen of FIG. 1.

Thereafter, if the select button is again depressed, hub 2 will be displayed as a separate screen as shown in FIG. 2. If the mouse select button is again depressed, the adjacent or related portion made up of spokes 3 will be displayed as a separate screen as shown in FIG. 3. In like manner, depressing the mouse select button again will result in selection and separate display of the adjacent portion made up of rim 4 as shown in FIG. 4.

It is to be appreciated that a key on the keyboard could be dedicated to reversing the selection order. This would save time and effort in going from spokes 3 to hub 2.

Figure 6:
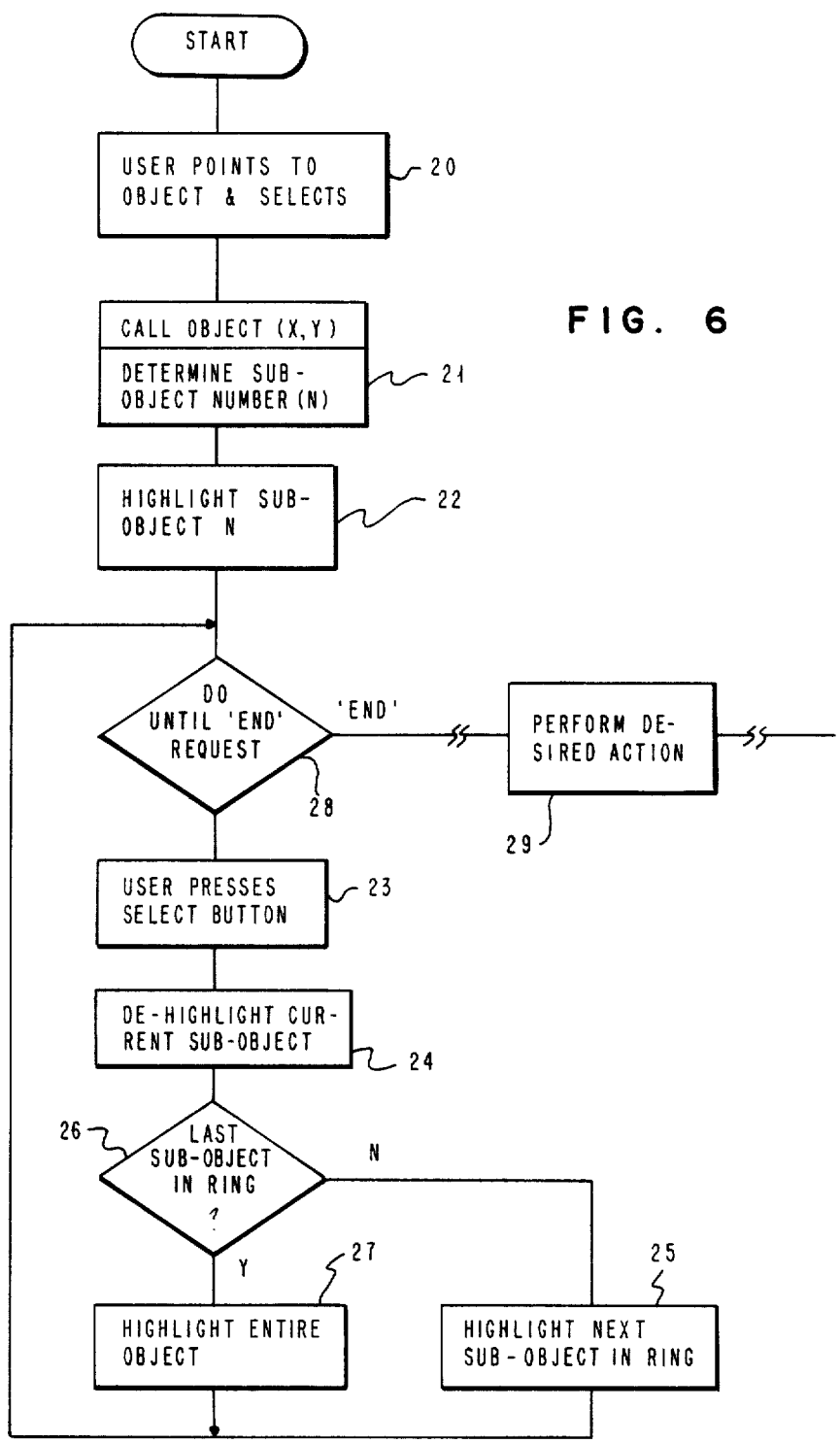
FIG. 6 is a flow chart illustrating operator and system operations in building the screen of FIG. 1 and later selection of the wheel of FIG. 1 and the portions of FIGS. 2–5.

Reference is next made to the flow chart of FIG. 6 which illustrates operator, or user, and system operations for building and selecting portions of a screen. When the user points to any portion of the object and presses a select button as indicated by block 20, the system determines, as indicated by block 21, which sub-object the pointer is actually on (or coincident with) and highlights that sub-object as indicated by block 22.

If the user presses the select button again, as indicated by block 23, the currently selected sub-object is dehighlighted, as indicated by block 24, and the next sub-object in the hierarchy of sub-objects is highlighted as indicated by block 25.

If the user presses the select button while the last sub-object is highlighted, as determined by block 26, the entire object made up of all sub-objects will be highlighted as indicated by block 27.

If the user again presses the select button, the process is repeated beginning with the first sub-object.

At any point, with any sub-object, or with the entire object highlighted, the user can press an end key to terminate the selection process with the current sub-object or entire object selected as determined by block 28. A user specified action might then be performed on the information selected as indicated by block 29.

Set out below is an illustration of a routine or application program useable by a processor included in the system. Also illustrated are operator building and defining of a screen made up of various portions and the system storing of the order in which the various portions are built and defined. This routine allows the operator to select the portions in order upon single button depression following selection of a first one of the portions. This application is in program design language from which source and machine code are derivable. Further, this routine is for highlighting the portions upon selection as opposed to causing a separate display.

| 1 | WHEEL | COMPOSED OF | |
|---|---|---|---|
| 2 | HUB | CIRCLE | (160,100),10 |
| 3 | SPOKES | LINE | (160,90)–(160,42) |
| | | LINE | (160,110)–(160,158) |
| | | LINE | (170,100)–(228,100) |
| | | LINE | (150,100)–(92,100) |
| | | LINE | (152,106)–(112,142) |
| | | LINE | (168,106)–(208,142) |
| | | LINE | (152,94)–(112,58) |
| | | LINE | (168,94)–(208,58) |
| 4 | RIM | CIRCLE | (160,100),70 |
| | | CIRCLE | (160,100),75 |
| 5 | TIRE | CIRCLE | (160,100),90 |
| | | CIRCLE | (160,100),75 |
| END WHEEL | | | |

"
"
"

DISPLAY WHEEL
"
"
"

ON SELECTION

-continued

CALL OBJECT (X,Y)
    ' when user selects an object
    ' determine structure of object
    ' at current x,y location -
    ' returns N=number of subobject
    ' selected & LAST_N highest N
    ' for select object (e.g., 5)
CALL HIGHLIGHT (OBJECT(N))
DO UNTIL END_KEY
  ON SELECTION
    ' highlight subobject under pointer
    ' until user presses "End" key to
    ' when user presses select button
  CALL UNHIGHLIGHT (OBJECT(N))
    ' unhighlight current subobject
  IF N=LAST_N
    ' if on last subobject
    N=1
    ' start over with entire object
  ELSE
    ' otherwise
    N=N+1
    ' pick next subobject
  ENDIF
  CALL HIGHLIGHT (OBJECT(N))
    ' highlight object/subobject picked
ENDDO A graphical object 'wheel' is defined by its constituent parts, 'hub', 'spokes', 'rim', and 'tire'. Each is a "subobject" of the object 'wheel' (WHEEL COMPOSED OF).

The 'wheel' is then presented to the user (DISPLAY WHEEL).

When the user positions a pointer ('6' in FIG. 1) on any part of the object such as the tire '5' in FIG. 1 and presses a 'select' button, the object's structure is determined (CALL OBJECT (X,Y)).

The selected subobject is highlighted through video reversing, displaying in a different color, etc. to indicate that it has been selected (CALL HIGHLIGHT).

If the user presses the 'select' button again, the next subobject within the object's structure is selected, the current subobject is un-highlighted and the new subobject is highlighted (ON SELECTION thru CALL HIGHLIGHT).

After the last built subobject (tire) has been selected, another 'select' button press causes the entire object ('wheel') to be selected and highlighted (IF N=LAST$_N$ then N=1).

The user may continue to 'cycle' through the object's structure until the desired subobject is selected at which time the 'End' key is pressed to finish the selection. The user may now perform some action on the selected object/subobject.

From the above, the user can determine the structure of an object by simply inspecting it with this selection technique. The object may be one which was created by someone else and with which the user was not familiar.

The user can 'cycle' through the object's substructure as many times as desired, viewing the subobjects one at a time before making a decision as to which one to select. Also, the user is not required to perform tedious 'group' and 'ungroup' commands and avoids the limiting 'modes' which result.

In summary, a unique method of, and system for, building a screen are provided in order to facilitate selecting related portions of a screen for editing, review, etc. Duing a screen building operation, each portion which is to be unique is identified. A later recall of the screen and selection of a portion will result in a separate display or highlighting of the selected portion. For selecting portions related to the selected portion, only a single button depression for each portion is required.

While the invention has been particularly shown and described with reference to a preferred embodiment, it will be understood by those skilled in the art that various changes in form and detail may be made without departing from the spirit and scope of the invention.

We claim:

1. In a device controlled display computer system including a device with a selection button, a method of selecting one of a plurality of closely-spaced portions of an object displayed on a display screen, said portions having an ordered relationship which corresponds to an order in which said portions were generated, said method comprising the steps of:
   a. positioning a selector coincident with a one of said plurality of portions of said object;
   b. causing, upon a first activation of said selection button, said one of said plurality of portions to be displayed in a more prominent manner on said screen relative to the remaining portions of said object; and
   c. causing, upon a second activation of said selection button, an adjacent portion of said plurality of portions to be displayed on said screen in a more prominent manner relative to the remaining portions including said one of said portions based on said ordered relationship between said portions without moving said selector.

2. A method according to claim 1 further includes the step of activating said selection button until a desired one of said plurality of portions is displayed more prominently than the remaining portions.

3. A method according to claim 2 further includes the step of editing said desired one of said plurality of portions.

4. A method according to claim 1 further includes the steps of:
   determining whether a last portion of said object based on said ordered relationship is presently being displayed more prominently than the remaining portions; and
   displaying all portions of said object in said prominent manner in response to the activation of the selection button during the display of said last portion.

5. In a device controlled display computer system including a device with a selection button, a method of generating a display screen having portions of an object displayed thereon such that a selective one of said portions may subsequently be selected and displayed in a prominent manner, said method comprises the steps of:
   generating in a sequential order said portions which define said object;
   storing said sequential order in which said portions are generated in said system;
   positioning a selector coincident with a one of said plurality of portions of said object;
   causing, upon a first activation of said selection button, said one of said plurality of portions to be displayed in a more prominent manner on said screen relative to the remaining portions of said object; and
   causing, upon a second activation of said selection button, an adjacent portion of said plurality of portions to be displayed on said screen in a more prominent manner relative to the remaining portions including said one of said portions based on said order between said portions without moving said selector.

6. A method according to claim 5 further includes the step of activating said selection button until a desired one of said plurality of portions is displayed more prominently than the remaining portions.

7. A method according to claim 6 further includes the step of editing said adjacent portion of said plurality of portions.

8. A method according to claim 7 further includes the steps of:
   determining whether a last portion of said object based on said ordered relationship is presently being displayed more prominent than the remaining portions; and
   displaying all portions of said object in said prominent manner in response to the activation of the selection button during the display of said last portion.

* * * * *

UNITED STATES PATENT AND TRADEMARK OFFICE
CERTIFICATE OF CORRECTION

PATENT NO. : 4,788,659

DATED : November 29, 1988

INVENTOR(S) : Richard E. Berry et al

It is certified that error appears in the above-identified patent and that said Letters Patent is hereby corrected as shown below:

Col. 7, Claim 4, line 41, delete "prominently" and substitute therefore --prominent--.

Signed and Sealed this

Twenty-third Day of June, 1992

Attest:

DOUGLAS B. COMER

*Attesting Officer*     *Acting Commissioner of Patents and Trademarks*